L. KRUMPELMANN.
BICYCLE SEAT SUPPORTER.
APPLICATION FILED AUG. 5, 1914.
1,145,493.
Patented July 6, 1915.
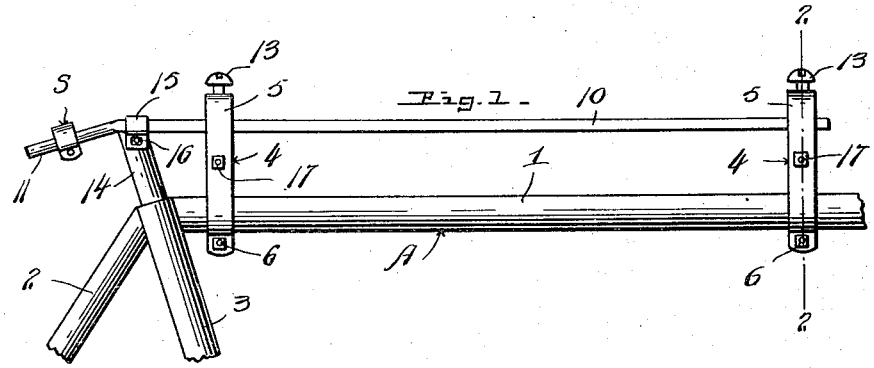
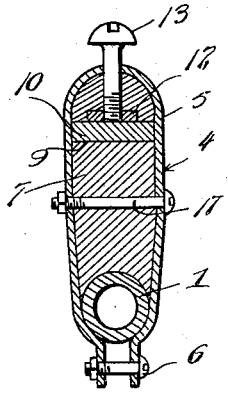
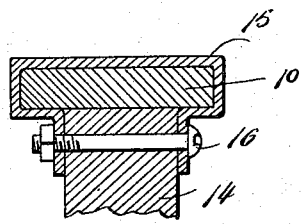
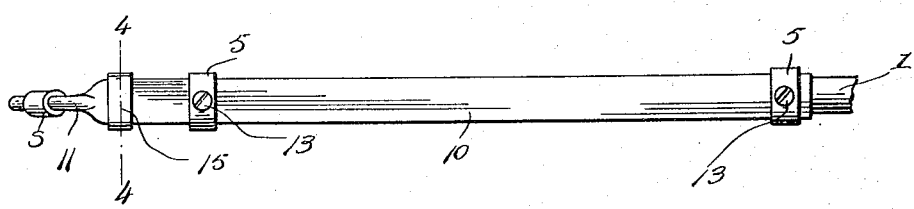
Witnesses
Inventor
L. Krumpelmann
By
Attorneys

UNITED STATES PATENT OFFICE.

LAURENS KRUMPELMANN, OF LYONS, IOWA.

BICYCLE SEAT-SUPPORTER.

1,145,493.   Specification of Letters Patent.   Patented July 6, 1915.

Application filed August 5, 1914. Serial No. 855,212.

*To all whom it may concern:*

Be it known that I, LAURENS KRUMPELMANN, a citizen of the United States, residing at Lyons, in the county of Clinton, State of Iowa, have invented certain new and useful Improvements in Bicycle Seat-Supporters; and I do hereby declare the following to be a full, clear, and exact description of the invention, such as will enable others skilled in the art to which it appertains to make and use the same.

This invention relates to certain novel and useful improvements in a seat support for bicycles, motorcycles and the like.

In carrying out my invention it is my purpose to provide an improved seat support by means of which shocks and jars to which the rider of a bicycle or motorcycle is usually subjected in traveling over a rough road are obviated.

Still a further object of my invention is to provide an improved form of shock absorbing seat support which will insure that the rider will obtain a perfect balance, certain parts of which may be so adjusted as to increase or decrease the resiliency of the support.

Another object of my invention is to provide a seat support of this class which will embody the desired features of simplicity, comfort and convenience, and which may be manufactured and marketed at a relatively low cost.

With the above recited objects and others of a similar nature in view, my invention consists in the construction, combination and arrangement of parts set forth in and falling within the scope of the appended claims.

In the accompanying drawings: Figure 1 is a view in side elevation of a portion of a bicycle frame showing my invention applied thereto. Fig. 2 is a vertical longitudinal sectional view taken through one of the bridge posts on the line 2—2 of Fig. 1. Fig. 3 is a top plan view of the invention shown in Fig. 1. Fig. 4 is a sectional view taken on the line 4—4 of Fig. 3.

In the present instance I have shown my invention as applied to a conventional form of the ordinary diamond bicycle frame, but I wish it to be understood that it is not limited in its useful application to machines employing this particular type of frame, as it is clearly applicable to the frames of motor cycles and like structures.

Referring now to the accompanying drawings in detail, the letter A designates a portion of a conventional bicycle frame including the top bar 1, the rear fork bar 2 and the tubular upright 3 which receives the seat post. In the present instance I mount upon the top bar 1 of the frame a pair of rigid posts 4, and as these posts are similar in construction, a description of one will suffice. Each post comprises a metallic inverted U-shaped member 5 adjustably clamped upon the bar 1 through the medium of a bolt 6 passing through the lower ends of the parallel arms of the U-shaped member.

A filler block 7 of wood or other suitable material is placed within the U-shaped member, and bears at its lower end as at 8 upon the top of the bar 1, while the top end 9 of each filler block is adapted to form a bearing or seat for the metallic spring bar 10. This bar is preferably in the nature of a relatively long flat strip of spring steel, terminating at its rear end in a rounded, downwardly inclined extension 11 adapted to receive the seat clip S, this clamp carrying the seat in the ordinary manner. As will be seen by reference to Fig. 1, the major portion or flattened section of the spring steel strip extends above and substantially parallel with the top bar 1 of the frame and is supported by the two bridge posts 4, resting as before stated upon the tops of the filler blocks 9 of these bridge posts. Relatively small bearing blocks 12 are housed within the bridge posts and rest on the top of the strip 10, and these bearing blocks are held in place by means of set screws 13 which are bolted through the bight portions of the U-shaped members of the bridge posts. It will thus be noted that when the set screws are tightened the strip 10 will be clamped between the filler blocks 9 and the bearing blocks 12. A post 14, made of wood, metal, or other suitable material slides freely in the tubular upright 3, and at its upper end is connected to the strip 10 by means of an inverted U-shaped clip 15 which spans the strip 10 and is secured to the post 14 by means of a bolt 16. In order to hold the filler blocks 9 in place, suitable cross bolts 17 may be employed, these bolts passing transversely through the filler blocks and through the U-shaped members 5 of the bridge posts and securing the filler blocks in position.

From the above description, taken in connection with the accompanying drawings, the construction and manner of employing my invention will be readily apparent to those skilled in the art. The seat is secured to the rounded downwardly inclined extension 11 of the strip or bar 10 by means of the usual seat clamp which is conventionally illustrated at S, and as the post 14 may slide in the tubular upright 3, the whole shock or jar incident to the travel of the machine over a rough road or over uneven places is taken up by the spring bar 10. It will further be noted that when it is desired to obtain a greater degree of resiliency or cushioning effect, the bridge post nearest the seat may be moved either toward the center of the bar 1 or toward the front of the frame by loosening the set screw of the bolt 6 and shifting the bridge post along the frame. Likewise when it is desired to decrease the resiliency of the strip 10, this rear bridge post is shifted nearer to the seat.

It will be noted that I have provided an exceedingly simple, yet efficient device for cushioning or absorbing the shocks and jars of a bicycle, motor-cycle and the like.

While I have herein shown and described one particular embodiment of my invention I wish it to be understood that I do not confine myself to all the precise details of construction herein set forth by way of illustration, as modification and variation may be made without departing from the spirit of the invention or exceeding the scope of the appended claims.

What I claim is:

1. The combination with a bicycle frame including a top bar and a tubular upright, of a pair of bridge posts mounted upon the top bar of said frame, a metallic spring bar clamped in said bridge posts, said bar having a seat supporting extension, and a post connected to the rear of the spring bar and sliding in the tubular upright of the frame.

2. The combination with a bicycle frame including a top bar and a tubular upright, of a pair of bridge posts adjustably mounted upon the top bar, each post including a U-shaped member, a filler block therefor, a resilient bar extending longitudinally of the top bar of the frame and extending through the bridge posts, said resilient bar resting upon the filler blocks of the bridge posts, means for fastening the resilient bar in the bridge posts, said resilient bar having a seat supporting extension at the rear thereof, and a depending post connected to the resilient bar adjacent the seat supporting extension, said post sliding in the tubular upright of the frame.

3. The combination with a frame including a top bar and a tubular upright, supports mounted upon the top bar, a resilient bar carried by said supports, said resilient bar having a seat supporting portion, and a post depending from the resilient bar and sliding in the tubular upright of the frame.

In testimony whereof, I affix my signature, in the presence of two witnesses.

LAURENS KRUMPELMANN.

Witnesses:
HARRY KOOK,
OTTO KRUMPELMANN.

Copies of this patent may be obtained for five cents each, by addressing the "Commissioner of Patents, Washington, D. C."